Hubbard & Conant.
Valve Motion.
No. 2,359. Reissued Sept. 18, 1866.
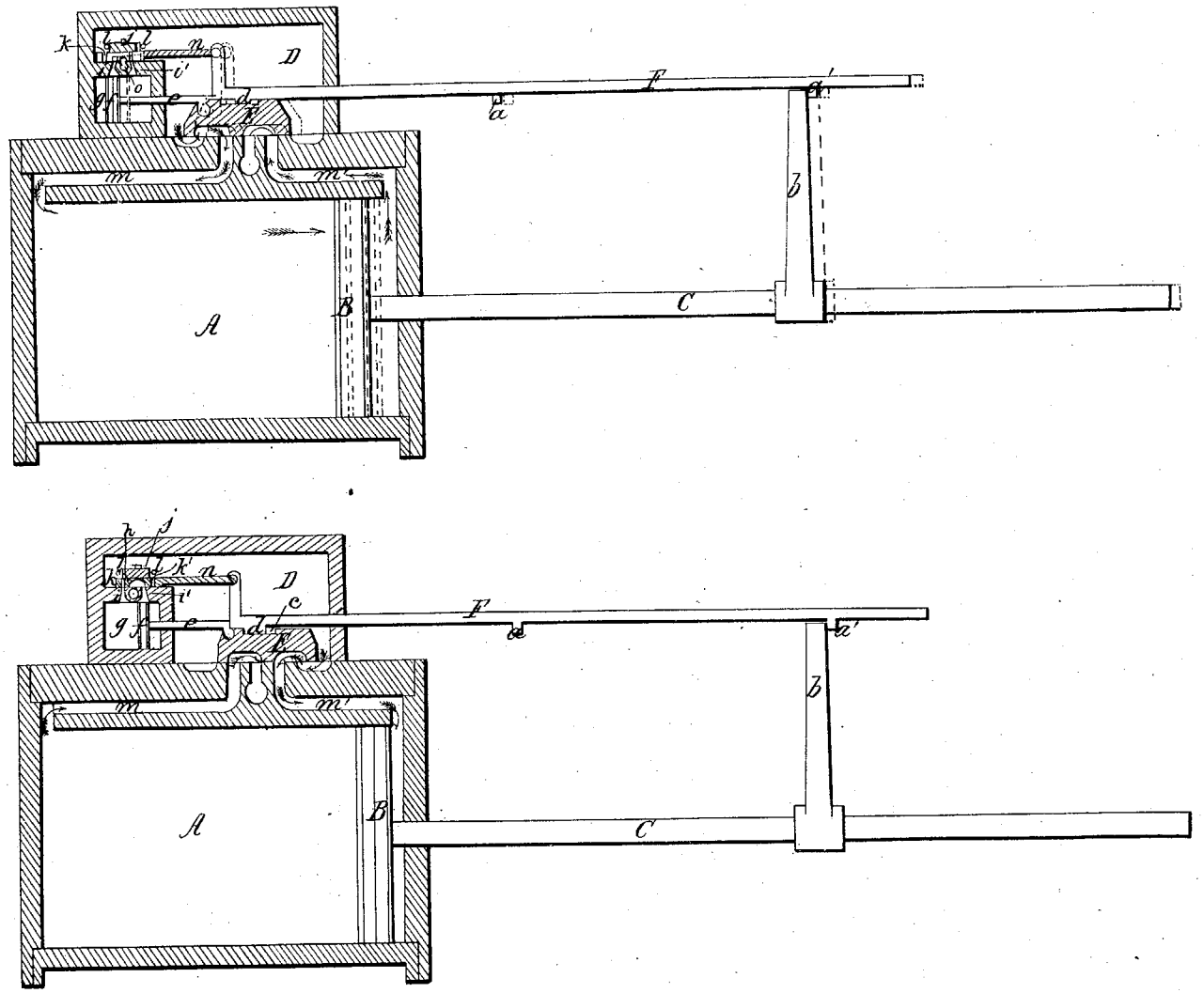
N. PETERS, PHOTO-LITHOGRAPHER, WASHINGTON, D. C.

UNITED STATES PATENT OFFICE.

G. W. HUBBARD, OF BROOKLYN, NEW YORK, AND WM. E. CONANT, OF LITTLE FALLS, NEW JERSEY.

IMPROVEMENT IN OPERATING SLIDE-VALVES IN DIRECT-ACTION ENGINES.

Specification forming part of Letters Patent No. 12,203, dated January 9, 1855; Reissue No. 2,359, dated September 18, 1866.

*To all whom it may concern:*

Be it known that we, GEORGE W. HUBBARD, of the city of Brooklyn, in the county of Kings and State of New York, and WILLIAM E. CONANT, formerly of Green Point, in the county and State aforesaid, but now of Little Falls, in the county of Passaic and State of New Jersey, have invented a new and Improved Valve-Motion for Direct-Action Engines; and we do hereby declare that the following is a full, clear, and exact description of the same, reference being had to the accompanying drawings, forming part of this specification, in which—

Figures 1 and 2 are two longitudinal central sections of a direct-action steam-engine having our improved valve-motion applied, showing the position of the valves and valve-motion at different stages of the operation of the engine.

Similar letters of reference indicate corresponding parts in both figures.

In double-acting direct-action steam-engines employed for pumping and other operations requiring only a reciprocating motion, and in which consequently no rotating shaft or fly-wheel are used, the means employed previous to this invention for operating the valve or valves by which the induction and eduction of the steam have been effected or governed have been more or less unreliable in their action or liable to get out of order.

The object of this invention is to provide a more effective means or mode of operating the induction and eduction valve or valves of such engines; and to this end the principal feature of the invention consists in effecting this operation without the use of a rotating shaft, by the connection of the said valve or valves with the piston of a supplementary direct-action engine whose induction valve or valves derive motion from the piston of the main engine.

As a portion of the stroke of the main valve can just as well be produced by the action of the main piston, and to produce the whole movement of the main valve by means of the supplementary engine would involve the consumption of more steam than would be required to effect only a portion of the stroke by that engine, we prefer to employ that engine merely to complete the movement of the main valve after the main piston has moved it to a position to close the ports, and cannot by direct action move it any farther.

In carrying out the above-mentioned principal feature of our invention various arrangements of the one engine for operating the valve or valves of the other and various systems of connection may be employed; but another feature of the invention consists in the arrangement of the cylinder and piston of one engine within the valve-chest of the other, and also in a novel system of valve-connections, whereby the desired result is very simply and effectively accomplished.

To enable others skilled in the art to apply our invention to use, we will proceed to describe the example of it which is represented in the drawings.

A is the cylinder of a direct-action steam-engine. B is the piston, and C the piston-rod, working through a stuffing-box in one of the heads of the cylinder. D is the steam-chest, containing the slide-valve E, for effecting the induction and eduction of steam to and from the cylinder A through the ports *m m'*. F is a rod connected with the valve E, passing through a stuffing-box at one end of the valve-chest, and furnished with tappets *a a'*, to be operated upon by a tappet-arm, *b*, on the piston-rod C. All the above parts are, or may be, of the usual form and construction, except that the valve E is not rigidly connected with the rod F, but contains a recess, *c*, that receives a hook or projection, *d*, on the said rod, which hook or projection is made shorter in the direction of the length of the rod than the recess, in order that the valve may be allowed to move some distance without the rod.

The valve E is connected with the piston-rod *e* of the piston *f*, working in the cylinder *g* of a second and smaller direct-action engine which is contained within the steam-chest D. This cylinder *g* is packed closely at each end, and has two ports, *i i*, above or on either side, for admitting steam to it from the steam-chest D, and an exhaust-port, *o*, for exhausting steam from it to the atmosphere, such admission and exhaustion of steam being controlled by the valve *h*, working over the said ports, and a cut-off, *j*, working on the back of the said valve to open and close the two passages *k k'*, which are made in the said valve for the admission of steam to the ports *i i'* of the cylinder *g*.

The valve *h* is connected in a positive manner by a rod, *n*, with the valve-rod F. The cut-off plate *j* merely rests upon the valve *h*, and the length of its movement is controlled by two fixed stops, *l l*, the length of movement allowed being equal to half the length of stroke of the slide-valve E minus the length of the ports *i i* in the cylinder *g* and slide-valve *h* of the smaller engine.

The amount of play allowed to the hook *d* of the slide-valve rod F in the recess *c* in the valve E is equal to the aforesaid length of movement allowed to the cut-off plate.

To describe the manner in which the valve E is operated, we will first suppose the steam-port *m* of the cylinder A to be open, and the piston B to have so nearly finished its stroke to the right that the tappet-arm *b* is just coming in contact with the tappet *a'*, to give the valve E the proper movement to effect the reversal of the movement of the piston B, as represented in black outline in Fig. 1. At this time the ports *i i* of the cylinder *g* are closed, and so have been from the commencement of the stroke of the piston B. The piston B will continue its motion beyond the above point until the tappet-arm *b* brings the valve E to a central position over the ports, as shown in red outline in Fig. 1, when, both steam-ports being closed, the motion of the said piston ceases, and the motion of the valve E would cease also, but that in moving from the black to the red position aforesaid the valve-rod E moves the valve *h* and opens the port *i* to admit steam to the small cylinder *g* to act on the piston *f*, for the purpose of driving the valve E to the end of its stroke and opening the port *m'* for reversal, as shown in Fig. 2. During the greater portion of that part of the movement of the valve E produced by the piston *f*, the valve-rod F and valve *h* are stationary as the projection or hook *d* on the rod is moving from end to end of the recess *c*; but just before the stroke of the valve E is completed the end of the said recess comes in contact with the said projection or hook, and the remainder of the stroke of the latter valve causes the valve *h* to be moved far enough for its passage *k* to be closed by the cut-off *j*, the movement of the valve E ceases. The ports *i i'* of the cylinder *g* remain closed and the valve E stationary, and all the valve-gear in the condition represented in Fig. 2, until the piston B, in its movement to the left, brings the tappet-arm into contact with the tappet *a*, when the valve E is operated upon in a manner in every respect precisely the reverse of that hereinbefore described, which will be readily understood.

The ports *i i'* are made of such width where they enter the cylinder *g* and are in such position that the piston *f*, at the instant the cutting off of the steam from one of the said ports is effected, just passes the edge of the opposite port to that through which the steam has been entering the cylinder *g* to drive said piston, and so allows the steam in the said cylinder to exhaust through the port *o*. This is illustrated best in Fig. 2, where the port *i* is supposed to be just closed by the cut-off *j*, and the steam which has just acted on the piston is exhausting through *i* and *o*.

The openings from the cylinder *g* into the ports *i i'*, though very small, are wide enough, as nearly the whole time occupied by the movement of the piston B is allowed for the exhaustion of the cylinder *g*.

This system of operating the valve of one steam-engine which is used as a motor by means of the piston *f* of a supplementary steam-engine which is merely a valve-working engine may be considered as essentially different from the combination of two steam-engines, both acting as motors, and of uniform size and power, in such manner that the valves of one is operated by the piston of another, for the motor in this case is a single engine. The system has, moreover, the advantage that its application may be universal, whereas it is only in a few cases that two engines, both of which are motors, can be used with advantage.

We do not confine ourselves to any particular relative arrangement of the cylinders; but

What we claim as our invention, and desire to secure by Letters Patent, is—

1. So combining a main engine or motor, a supplementary valve-working engine, and their induction and eduction valve or valves that the movement of the valve or valves of the main engine or motor is commenced and partly effected by the piston of said engine and completed by the piston of the supplementary or valve-working engine, substantially as herein described.

2. When two direct-action engines are so combined that the movement of the induction and eduction valve or valves of one is produced by the movement of the piston of the other, the arrangement of the cylinder and piston of one engine within the valve-chest of the other, substantially as herein described.

3. In operating the slide-valve of one direct-action engine by the piston of another, so connecting the said slide-valve with a tappet-rod operated by an arm on the piston-rod of its own engine that the said rod and valve may have each a certain amount of motion independently of the other, substantially as and for the purpose herein specified.

4. The arrangement of the valves E and *k*, the tappet-rod F and its connections with the said valves, and the cut-off plate *j*, and stops *l l*, substantially as described, for the purpose set forth.

GEORGE W. HUBBARD.
WILLIAM E. CONANT.

Witnesses:
JOHN COCHRANE,
ANDREW I. TODD.